United States Patent
Trichet et al.

(10) Patent No.: US 10,948,397 B2
(45) Date of Patent: Mar. 16, 2021

(54) PARTICLE CHARACTERISATION IN OPEN OPTICAL RESONATOR CAVITY

(71) Applicant: Oxford University Innovation Limited, Oxford (GB)

(72) Inventors: Aurélien Trichet, Oxford (GB); Jason Michael Smith, Oxford (GB); Claire Vallance, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 277 days.

(21) Appl. No.: 16/098,884

(22) PCT Filed: May 22, 2017

(86) PCT No.: PCT/GB2017/051427
§ 371 (c)(1),
(2) Date: Nov. 5, 2018

(87) PCT Pub. No.: WO2017/203224
PCT Pub. Date: Nov. 30, 2017

(65) Prior Publication Data
US 2020/0209141 A1  Jul. 2, 2020

(30) Foreign Application Priority Data
May 23, 2016  (GB) ..................... 1609017

(51) Int. Cl.
*G01N 15/14* (2006.01)
*B01L 3/00* (2006.01)
(52) U.S. Cl.
CPC ...... *G01N 15/1436* (2013.01); *B01L 3/50273* (2013.01); *G01N 15/1456* (2013.01);
(Continued)

(58) Field of Classification Search
CPC .......... G01N 15/1436; G01N 15/1456; G01N 15/1484; B01L 13/50273; B01L 2300/0809; B01L 2300/168
See application file for complete search history.

(56) References Cited

U.S. PATENT DOCUMENTS 5,608,519 A  3/1997  Gourley et al.
5,903,347 A  5/1999  Girvin et al.
(Continued)

FOREIGN PATENT DOCUMENTS

JP  2008191147 A  8/2008
WO  2013/164642 A1  11/2013

OTHER PUBLICATIONS

International Search Report and Written Opinion of corresponding International Application No. PCT/GB2017/051427 dated Jul. 26, 2017.
(Continued)

*Primary Examiner* — Dominic J Bologna
(74) *Attorney, Agent, or Firm* — Renner, Otto, Boisselle & Sklar, LLP

(57) ABSTRACT

Characteristics of polarizable particles in a fluid are detected using an optical cavity comprising opposed optical reflectors containing the fluid. A particle is introduced through the fluid into the optical cavity. The particle may be transiently in the cavity or optically trapped. The optical cavity containing the particle is illuminated with light that excites resonance of an optical mode of the optical cavity that is affected by the particle. A measurement of a parameter of the excited resonance is derived, for example while tuning through the resonance. Repeated measurements may be used to derive a measure of a characteristic of the particle that is dependent on the motion of the particle in the optical cavity.

25 Claims, 8 Drawing Sheets

(52) U.S. Cl.
CPC .. *G01N 15/1484* (2013.01); *B01L 2300/0809* (2013.01); *B01L 2300/168* (2013.01)

(56) References Cited

U.S. PATENT DOCUMENTS

| | | | | |
|---|---|---|---|---|
| 2007/0014505 A1* | 1/2007 | Hosomi | ............ | G01N 21/4133 385/12 |
| 2008/0186503 A1* | 8/2008 | Kiesel | ............ | G01N 21/031 356/454 |
| 2011/0036719 A1 | 2/2011 | Neyts et al. | | |
| 2014/0125990 A1* | 5/2014 | Hinderling | ............ | G02B 5/284 356/496 |
| 2015/0077747 A1* | 3/2015 | Smith | ............ | G01N 21/31 356/318 |
| 2016/0084747 A1* | 3/2016 | Arnold | ............ | G01N 21/31 356/335 |

OTHER PUBLICATIONS

Search Report of corresponding Great Britain Application No. 1609017.7 dated Oct. 6, 2016.
Kiesel et al., "Cavity cooling of an optically levitated submicron particle", PNAS, Aug. 27, 2013, 110 (35), 14180-14185.
Trichet et al., "Nanoparticle Trapping and Characterization Using Open Microcavities", Nano Lett. 2016, 16 (10), pp. 6172-6177.
Kelkar et al., "Sensing Nanoparticles with a Cantilever-Based Scannable Optical Cavity of Low Finesse and Sub-lambda", vol., Physical Review Applied 4, (2015).
Trichet et al., "Open-access optical microcavities for lab-on-a-chip refractive index sensing." Lab on a chip 14, 4244-4249 (2014).
Stapfner et al., "Cavity-enhanced optical detection of carbon nanotube Brownian motion", Applied Phys. Lett. 102, 151910 (2013).
Hayasaki, "Holographic three-dimensional motion detection of an optically trapped sub-100 nm gold nanoparticle", Optics Communications 322, 22-26 (2014).
Mathieu, "Self-induced back-action optical trapping of dielectric nanoparticles", Nature Physics 5, 915 (2009).
Descharmes et al., "Observation of Backaction and Self-Induced Trapping in a Planar Hollow Photonic Crystal Cavity", Phys. Rev. Lett. 110, 123601 (2013).
Van Der Pol et al., "Refractive Index Determination of Nanoparticles in Suspension Using Nanoparticle Tracking Analysis", Nano Letters 14, 6195-6201 (2014).
Gardiner et al., "Measurement of refractive index by nanoparticle tracking analysis reveals heterogeneity in extracellular vesicles", Journal of Extracellular Vesicles 3, 25361 (2014).
Mitra et al., "Nano-optofluidic Detection of Single Viruses and Nanoparticles", ACS Nano 4, 1305 (2010).

* cited by examiner

PARTICLE CHARACTERISATION IN OPEN OPTICAL RESONATOR CAVITY

This application is a national phase of International Application No. PCT/GB2017/051427 filed May 22, 2017, and claims priority to Great Britain Application No. 1609017.7 filed on May 23, 2016, which is incorporated herein by reference.

TECHNICAL FIELD

The present invention relates to characterisation of particles.

BACKGROUND

The ability to achieve label-free characterisation of particles, which may be nanoparticles, in solution is important for a wide range of industrial and scientific applications. Fields as diverse as healthcare, materials science, environmental science, and security all involve the detection and identification of particles. Techniques capable of identifying nanoparticles between 30 nm and 300 nm in size at very low concentrations are particularly useful in the life sciences and security applications, since viruses and particles such as exosomes (which are key actors in the transport of genetic information) are typically to be found in this size range. Methodologies that allow characterisation of multiple properties at the single particle level are particularly valuable for real-time monitoring and identification of particles without prior knowledge of the contents of the fluid sample.

The most common technique used for particle detection and characterisation in practice is dynamic light scattering (DLS). In DLS, a solution is illuminated with laser light, and temporal fluctuations in the spatial distribution of the scattered intensity are used to determine a size distribution of particles based on their coefficient of friction and the viscosity of the surrounding fluid. This technique is generally employed to characterise large ensembles of particles, but can also be adapted to individual nanoparticles (an example instrument being Malvern Instruments NanoSight) whereby it is known as Nanoparticle Tracking Analysis (NTA). It can be combined with other techniques, for example electrophoresis to characterise particle zeta potentials.

Size information alone is often insufficient to identify a particle in a sample, and further information is needed about the shape, constituent material, or chemical properties. One parameter that can help in identification is the dielectric polarizability $\alpha$, which depends on the size, shape, and refractive index. One method for measuring the polarizability is via the scattering intensity which for small particles scales as $\alpha^2$, but this presents difficulties due to the wide dynamic range of the signal in polydisperse samples and the need for careful calibration of optical intensities. For small particles, interference between a reflected (or transmitted) and scattered beam provides a signal that is proportional to a, but this is unsuitable for measuring moving particles, for which the relative phase of the scattered light is strongly time dependent. Interferometric methods such as heterodyne detection have been developed to transfer the need for phase stability from the sample to the instrument, but challenges remain in producing a robust instrument in which the interferometer is stable to environmental perturbations.

The trapping and manipulation of particles in focused optical beams is also well established. Typically, Gaussian beams from highly focused lasers are used, whereby the particle is trapped close to the focal region. The field intensity defines a trapping potential which constrains but does not eliminate the Brownian motion of the particle. The motion of the particle can be monitored in a similar way to DLS, by measuring the fluctuations in the scattered light signal (or equivalently the transmitted signal) to indicate the position of the particle in the trap. However, quantitative analysis of the diffusive motion of a particle in a trap to extract the particle size is hampered by the need for an accurate calibration of the trap stiffness parameter, for which a priori knowledge of the polarizability of the particle is necessary. The problem of calibration of scattering intensities to obtain the polarizability remains.

In recent years a few reports have emerged of resonant optical cavities such as photonic crystal cavities being used to trap and characterise particles. In these systems, the presence of the particle causes a spectral shift in the cavity mode resulting from the difference between its refractive index and that of the surrounding medium. These spectral shifts can be monitored to study the motion of the particle. The maximum magnitude of the shift provides a direct measure of the particle polarizability based on the known field intensity distribution in the trap, and therefore offers great potential for combining fully calibrated particle characterisation based on the diffusive motion with measurement of other particle properties.

Such methods using photonic crystal cavities offer the requisite high quality resonances and small mode volumes to trap and characterise small particles, but are often limited by lack of reproducibility in the cavity mode, partly caused by the fact that the trapping potential in these cavity designs is generally strongest either coincident with or very close to the interface with the solid dielectric medium of the photonic crystal. The details of the contact force between the particle and the solid cavity structure can therefore become important, as does the change in friction coefficient for the particle diffusing in the liquid medium. Self-induced back action, whereby the trapping field intensity is dependent on the particle position, can mitigate this problem, but is difficult to calibrate. Additional challenges are presented in the spectral tuning of photonic crystal cavity modes relative to the laser excitation wavelength, with the requirement for expensive tuneable laser sources limiting their commercial potential, and in the coupling of light into and out of the cavity mode, which requires advanced optical wave-guiding techniques. Some work has also been carried out on nanoscale optical cavities based on surface plasmons, but these are difficult to fabricate in a reproducible fashion and do not yet allow quantitative analysis of trapped particles.

In summary, there is a clear need for the development of techniques which allow quantitative characterisation of particles and which can be implemented using simple, inexpensive devices.

SUMMARY

According to the present invention, there is provided a method for detecting characteristics of polarizable particles in a fluid, the method for detecting characteristics of polarizable particles in a fluid, the method using an open optical cavity comprising opposed optical reflectors containing the fluid therebetween, the method comprising:

introducing at least one particle through the fluid into the optical cavity;

illuminating the optical cavity containing the particle with light that excites resonance of an optical mode of the optical cavity that is affected by an individual particle; and deriving at least one measurement of at least one parameter of the excited resonance.

Thus, the method provides detection of characteristics of polarizable particles by using an open optical cavity comprising opposed optical reflectors. This allows particles to be introduced into the optical cavity by disposing the particles in a fluid that may be contained in the optical cavity between the opposed optical reflectors. This construction is straightforward to implement and facilitates introduction of particles for measurement. Resonance of an optical mode of the optical cavity that is affected by an individual particle is excited and a measurement of at least one parameter of the excited resonance is derived. The resonance is perturbed by the particle as a result of the difference in optical properties (e.g. refractive index) between the particle and the surrounding fluid. This allows characterisation of the particle with minimal perturbation to its intrinsic properties. Such a method can be used in a wide range of applications, from the biomedical and environmental sciences to security and manufacturing.

The optical cavity and illuminating light may be arranged so that the resonance optically traps the particle in the optical cavity. This provides numerous advantages. Firstly, it allows for capture and measurement of the particle over time periods that are significantly longer than typical diffusion periods for which the particle would otherwise remain in the optical cavity. Secondly, the measured parameter provides information about the motion of the particle within the trapping potential, which significantly increases the useful quantitative information about the characteristics of the particle that may be derived by analysis of repeated measurements. For example, measures of parameters that are dependent on light scattering by the particle may be derived. Furthermore, measures of characteristics of the particle that are dependent on the motion of the particle in the optical cavity may be derived from a distribution of repeated measurements. Examples of characteristics which may be studied include the polarizability of the particle, the temperature of the particle, the coefficient of friction of the particle and/or the size of the particle.

The method may be implemented using equipment with relatively low cost and with ease of manufacture.

Advantageously, the step of illuminating the optical cavity further comprises tuning through the resonance, so that the at least one measurement of at least one parameter of the excited resonance may be derived by analysis of the output in the time domain. In that case, tuning may be achieved using opposed reflectors that are relatively movable, that is tuning through the resonance by relatively moving the opposed reflectors to tune the cavity length. This allows the method to be implemented easily and with low cost equipment. The source of the illuminated light may have a fixed frequency allowing the use of a simple source such as a diode laser, avoiding the need for a tuneable narrow linewidth light source. Similarly, the detector of the illumination may be a simple device such as a photodiode avoiding the need for high resolution spectroscopic measurement. This brings the additional advantage that the method can be readily scaled up to an array device for parallel sensing using an array of optical cavities or an extended planar cavity in combination with commonly available time-resolved imaging detectors.

BRIEF DESCRIPTION OF THE DRAWINGS

To allow better understanding, embodiments of the present invention will now be described by way of non-limitative example with reference to the accompanying drawings, in which.

DETAILED DESCRIPTION

Figure 1:
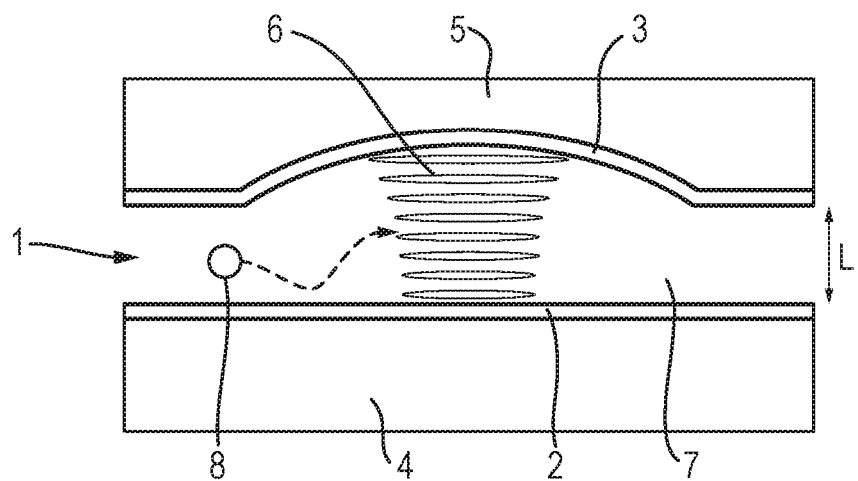
FIG. 1 is a cross-sectional view of an open optical cavity.

In the methods described herein, the light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 µm). The light may be a mixture of wavelengths. Herein, the terms 'optical' and 'optics' are used to refer generally to the light to which the methods are applied.

In the methods described herein, the particle may be of the following types.

The methods described herein may be applied to any type of polarizable particle of interest. In principle, any particle that is polarizable will affect the resonance and so provide a response, although the degree of polarizability may affect the size of the response.

The particle may be of any size, with proviso that the optical cavity needs to be of sufficient size to accommodate the particle. Such size constraints may prevent relatively large particles being characterised using relatively small optical cavities.

The particle may be a nanoparticle having an average dimension of the order of nanometres, tens of nanometres or hundreds of nanometres. In many useful applications, the particles may have an average dimension in the range from 30 nm to 300 nm, particularly in the life sciences and security applications. However, this is not limitative and the particles may be larger, including particles having an average dimension of the order of micrometres or above.

The particle may be a molecule or collection of molecules. Such a molecule may be a non-biochemical molecule, for example a chemical catalyst. Such a molecule may be a biochemical molecule, for example a protein, a virus or an exosome.

The particle may have a binding site for another particle, which may be a chemical or biochemical binding site. As such the methods may be performed during a chemical or biochemical reactions in order to monitor and characterise the changing properties of the particles in the reaction.

Other characterisation methods may be performed in parallel with the present method. Such other characterisation methods may be spectroscopic methods. Such other characterisation methods may be, for example, methods using fluorescence, Raman scattering or resonant energy transfer.

The method may be applied to characterise particles in any application where the characteristics of the particles is of interest, providing a wide range of applications. Some non-limitative examples are: detection and identification of particles, such as viruses or aerosols; studying of chemical reactions, such as binding events and catalysis that can occur on a particle surface; and studying changes of particles with time.

In the methods described herein, the fluid may be of any type that is capable of carrying the particle. The particle may be in suspension.

Without limitation, the fluid may be water or an aqueous solution, or may be a non-aqueous solution.

The present methods use an open optical cavity comprising opposed optical reflectors containing the fluid therebetween.

The optical cavity may be an "open access microcavity". Such microcavities have in recent years been the subject of increasing study, and some basic sensing methods using open cavities have been demonstrated. Such cavities bring a number of advantages for sensing including the ability to flow fluid through the region of maximum field intensity and the facile coupling to external free-space or fibre optics. Moreover these cavities can be manufactured with a high degree of reproducibility, a prerequisite for quantitative measurements.

The optical cavity may have a cavity length of at most 100 μM, preferably at most 50 μm.

To provide lateral confinement and separation of optical modes, at least one of the reflectors may be concave in two orthogonal dimensions. The cavity length may be less than the radius of curvature of the concave reflector. Such optical cavities provide stable optical modes confined in all three spatial dimensions when the cavity length is less than the radius of curvature of the concave reflector. At least one of the reflectors that is concave may have a radius of curvature of at most 50 μm in the two orthogonal dimensions.

The open optical cavity may be of the type disclosed in WO-2013/164642.

Advantageously, the optical cavity may have an optical mode volume of 10 $\mu m^3$, for example of order 1 $\mu m^3$, or less and/or the optical cavity may have a finesse of 100 or more, or preferably 1000 or more. The realisation of optical cavities with such mode volumes and finesses allows the perturbations from individual particles to be detected, allowing the particles to be characterised.

Alternatively, both of the reflectors may be planar. In this case, the cavity length may range from 100 μm down to few hundreds of nanometers, i.e. the single anti-node limit. In this configuration, the optical modes are confined in the dimension extending between the reflectors, but are not confined in the dimensions orthogonal to that and can propagate transversely. An area up to few hundreds of $\mu m^2$ can be studied allowing a significant increase in multiplexing.

Figure 2:
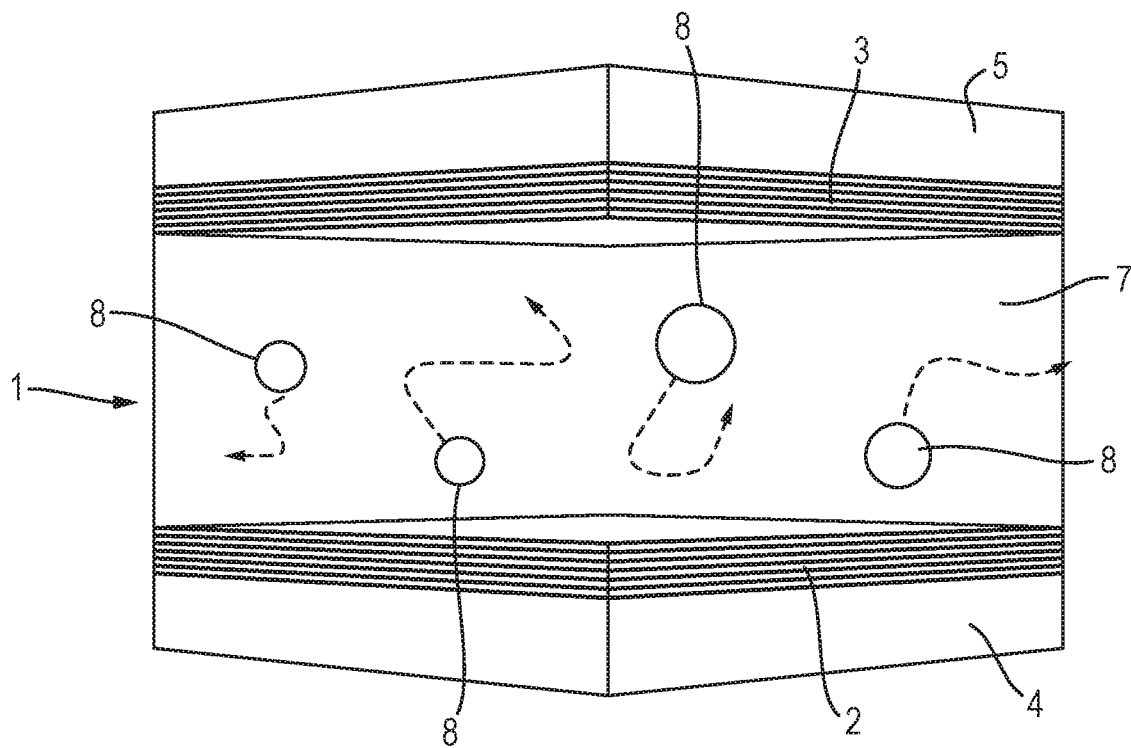
FIG. 2 is a schematic perspective view of an extended open optical cavity.

Examples of an open optical cavity 1 that may be used in the present methods are shown in FIGS. 1 and 2 and arranged as follows.

In both the examples of FIGS. 1 and 2, the optical cavity 1 comprises opposed optical reflectors 2, 3. The reflectors 2, 3 are dielectric Bragg reflectors formed on respective substrates 4, 5, although other forms of reflector could in principle be used. The substrates 4, 5 are sufficiently transparent to allow light to illuminate the optical cavity 1.

In the example of FIG. 1, one reflector 2 is planar and the other reflector 3 is curved, so that that the optical cavity 1 confines an optical mode 6. In contrast in the example of FIG. 2, both reflectors 2 and 3 are planar.

In both the examples of FIGS. 1 and 2, the reflectors 2, 3 may be relatively movable, by moving the substrates 4, 5 relative to each other. The optical cavity 1 is open between the opposed optical reflectors 2, 3 allowing access thereto. In use, the optical cavity 1 contains a fluid 7 which may be flowed into the optical cavity 1 using a fluidics system. The fluid 7 may contain particles 8 as shown schematically in FIGS. 1 and 2. The fluid 7 may contain particles 8 at relatively low concentration. Given the small size of the optical cavity 1, an individual particle 8 may be introduced into the optical cavity 1 at a time.

The methods may be applied to a device 10 comprising an array of plural optical cavities 1 which each comprise opposed optical reflectors, and for example may each be an optical cavity 1 as shown in FIG. 1. This allows individual particles 8 to be introduced into different, respective optical cavities 1, while all the optical cavities 1 are illuminated simultaneously, for example with light from the same light source. Thus, resonances of an optical mode of the optical cavities that contain a particle are affected by the respective particles. That allows parallel measurements to be derived that provide information about populations of particles 8. For simultaneous illumination, light from the same light source may be split using conventional beam splitters and directed to different optical cavities 1. In principle, an alternative would be to use a light source having a beam that is sufficiently wide to illuminate different optical cavities 1, but that increases the power requirement of the light source needed to provide light of sufficient power to each optical cavity 1.

Where the device comprises an array of plural optical cavities 1, the opposed optical reflectors of the plural optical cavities 1 may be formed on common opposed substrates 4, 5.

Alternatively, the methods may be applied to a device 10 comprising a single optical cavity 1 which may be for example may an optical cavity 1 as shown in FIG. 2. This allows plural particles 8 to be introduced into the optical cavity 1, while an area of the optical cavity 1 is illuminated simultaneously, for example with a plane wave laser light from the same light source. Thus, resonances of an optical mode of the optical cavities in localised regions around individual particles that are affected by the individual particles may be excited, and measurements of the excited resonances in respect of said localised regions may be derived. That allows parallel measurements to be derived that provide information about populations of particles 8, similarly to the case of using plural optical cavities 8 as described above. For simultaneous illumination, light from the same light source may be split or expanded using conventional optical components, for example beam splitters, and directed to different regions of the optical cavity 8. In principle, an alternative would be to use a light source having a beam that is sufficiently wide to illuminate an extended region of the optical cavity 1.

A detector may detect the output light from each optical cavity 1 together, in the case of a device 10 comprising plural optical cavities 1, or from different localised regions together, in the case of a device 10 comprising a single optical cavity 1 into which plural particles 8 are introduced. For example, the detector may be an imaging sensor that detects light from an extended area of the optical cavity 1 having sufficient spatial resolution to separately detect the different localized regions. That allows, the resonances in the different localized regions to be detected and tracked as the particles 8 move.

In a device 10 comprising an array of plural optical cavities 1, the optical cavities 1 may have different resonant frequencies. Similarly, in a device 10 comprising a single optical cavity 1 into which plural particles 8 are introduced, the optical cavity 1 may have different resonant frequencies in different regions.

Different resonant frequencies may be achieved by varying the design of the reflectors to vary the resonant frequency, for example by varying the cavity length (for example by offsetting the reflectors) and/or by varying the radii of curvature, in the case of plural optical cavities 1 being formed in the same device 10.

Different resonant frequencies may be also achieved by relatively inclining the substrates 4, 5 on which the reflectors are formed at a non-zero angle to vary the cavity length along the inclined substrates 4, 5. This may be applied to a device 10 comprising an array of plural optical cavities 1 or to a device 10 comprising a single optical cavity 1 into which plural particles 8 are introduced.

As a result of having different resonant frequencies, the output light from each optical cavity 1, or from different localised regions of the optical cavity 1, may be detected together by the detector, but the excited resonances of optical modes of the optical cavities 1 at different resonant frequencies are separated and may therefore be distinguished. Thus, the use of optical cavities 1 with different resonant frequencies provides spatial resolution of the different optical cavities 1, or of different localised regions of the optical cavity 1, in the frequency (or wavelength) domain.

However, as an alternative, the output light from each optical cavity 1 may be detected separately, for example by directing the output light to plural separate detectors, or by using an imaging detector that can spatial resolve the output light from each optical cavity 1. In that case, it is possible to use an array of plural optical cavities 1 having the same resonant frequency, or an optical cavity 1 into which plural particles 8 are introduced.

Figure 3:
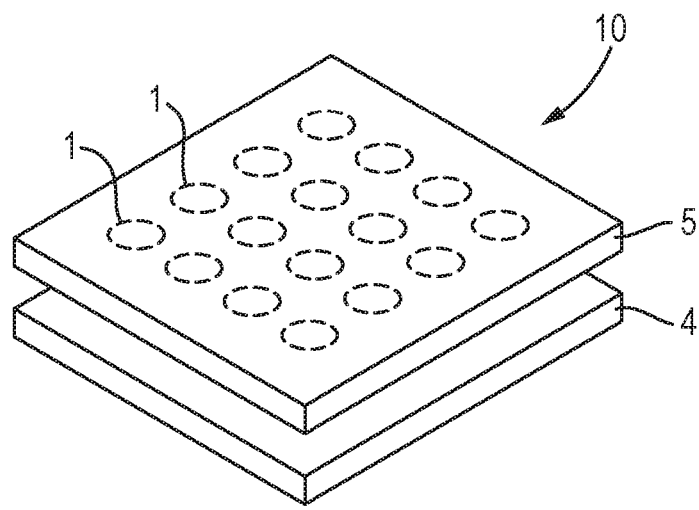
FIG. 3 is a schematic plan view of a device comprising plural optical cavities of the type shown in FIG. 1.

FIG. 3 shows an example of a device 10 comprising plural optical cavities 1 of the type shown in FIG. 1, which is arranged as follows. In this example, there are sixteen optical cavities 1, but in general any number of optical cavities 1 may be provided. The device 10 comprises respective substrates 4, 5, similar to the example of FIG. 1, but each comprising a respective array of reflectors 2, 3 to form the plural optical cavities 1 between the common substrates 4, 5. The locations of the optical cavities 1 are illustrated in dotted outline in FIG. 3, but are formed between the substrates 4, 5.

Figure 4:
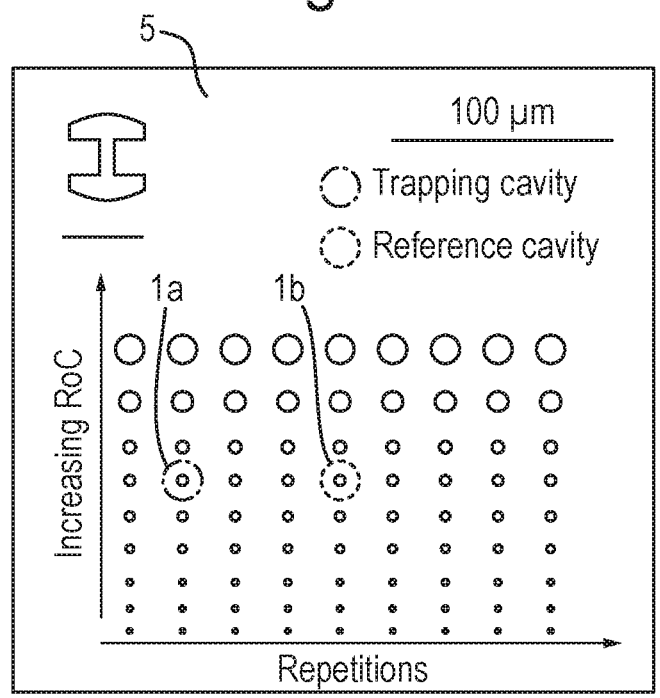
FIG. 4 is a scanning electron microscope image of a substrate of a device of the type shown in FIG. 3.

FIG. 4 is a scanning electron microscope image of a substrate 5 of a device 10 of the type shown in FIG. 3. FIG. 4 shows the array of concave reflectors 3. In this example, the concave reflectors 3 have a Radius of Curvature (RoC) of about 4 µm (subject to the variation discussed below). Two optical cavities 1 referred to as a trapping cavity 1a and a reference cavity 1b are circled and used as described below.

In the device 10 formed using the substrate 5 shown in FIG. 4, the optical cavities 1 of each row of optical cavities 1 have different radii of curvature but the optical cavities 1 within each row have the same radius of curvature. As described below, this device 1 may optionally be used with the substrates 4, 5 relatively inclined at a non-zero angle along the rows to vary the cavity length and hence the resonant frequency along each row.

The substrate 5 shown in FIG. 4 and the corresponding substrate 4 of a device 10 of the type shown in FIG. 3 were formed as follows. Concavities were produced in the substrate 5 using a Focused Ion Beam (FIB) in order to control its topography at the nanometer scale. The substrate 4 was planar. Reflectors 2, 3 were formed by coating the substrates 4, 5 with Dielectric Bragg Reflector (DBR) stacks made up of 16 layers of $SiO_2/TiO_2$ with high refractive index for the last layer to minimise field penetration into the mirrors. The layer thicknesses in the reflectors 2, 3 were designed to provide maximum reflectivity at a wavelength of 640 nm. The concave reflectors 2 were situated on a substrate which was approximately square with side length 300 µm, as shown in FIG. 4.

By aligning the substrate 4 opposite the substrate 5, the optical cavities 1 were formed with cavity lengths of order 1 µm. At this cavity length, the planar parts of the reflectors 2, 3 on the substrates 4, 5 are separated by approximately 400 nm providing sufficient space through which the particles 8 can diffuse into the optical cavities 1.

Figure 5:
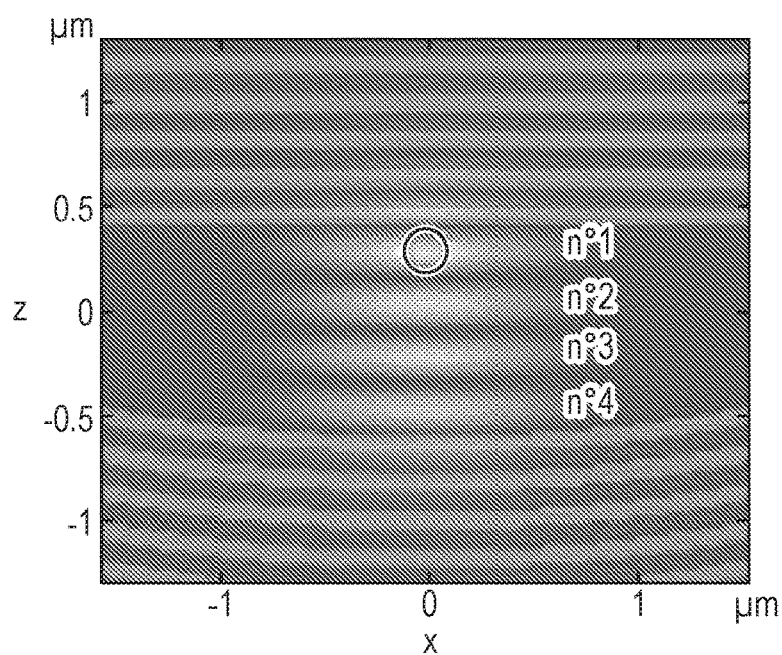
FIG. 5 is a cross-sectional image of a simulation of an optical cavity of the type shown in FIG. 1.

With this cavity length the confined optical mode has four antinodes (field intensity maxima) between the reflectors. FIG. 5 shows an FDTD (finite-difference time-domain) simulation of the $TEM_{00}$ optical mode of the optical cavity 1 (wherein TEM stands for transverse electromagnetic and 00 refers to the order of the mode being the fundamental mode of lowest order). FIG. 5 illustrates the electric field intensity distribution in a vertical cross-sectional plane, superimposed on a shaded map of the refractive index. The four antinodes 12 are numbered from 1 to 4. A particle 8 may be optically trapped within any of the four antinodes 12. In FIG. 5, the particle 8 has a diameter of 200 nm for illustrative purposes.

The optical cavities 1 have a mode volume of about 0.3 µm³ with a mode waist of about 730 nm. The quality factor Q of the optical cavities 1 was measured to be 18,000 (corresponding to a finesse of 3000).

Figure 6:
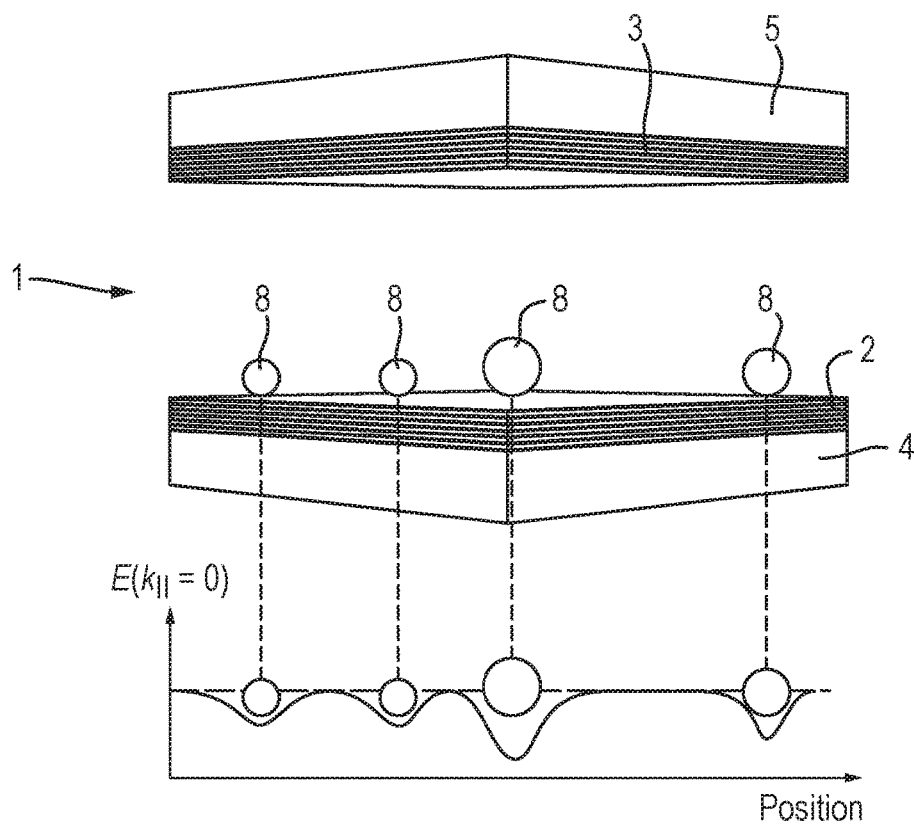
FIG. 6. is a plot of the energy of the band edge in the case of an optical cavity of the type shown in FIG. 2 as a function of position in presence of nanoparticles.

In an alternative configuration, the device 10 may be formed by reflectors 2 and 3 which are planar as shown in FIG. 2 with extended extent. This will be referred to herein as the device 10 having an "extended planar configuration". In the extended planar configuration, the planar modes energies form a continuum for which each energy corresponds to a different transverse momentum $k_r$. The lowest energy $E_0$ of this continuum does not propagate transversely and therefore has no transverse momentum $k_r$. Any disturbance, such as the presence of the particle 8, localizes the modes and induces a resonance having a resonant mode shift in a localised region of the optical cavity 1 as shown in FIG. 6. In different terms, the disturbance of the optical medium caused by the particle 8 creates local band bending.

As a consequence, one can measure the resonant shift of the mode at the energy $E_0$ by measuring the output light perpendicularly to the cavity 1 in the localised regions around the individual particles 8 and infer properties of the particle 8 in the same way as the previous method described. The localised regions around an individual particle 8 in this alternative configuration are therefore functionally equivalent to the plural optical cavities 1 in the device of FIG. 3 and can be used in the same way. This approach offers the interest to increase the number of particles 8 that can be measured simultaneously. This alternative configuration can also be used to trap particles 8 longitudinally.

The resonances in the different localized regions to be detected and tracked as the particles 8 move, for example by using a detector that is an imaging sensor that spatially resolves light from an extended area of the optical cavity 1.

Figure 7:
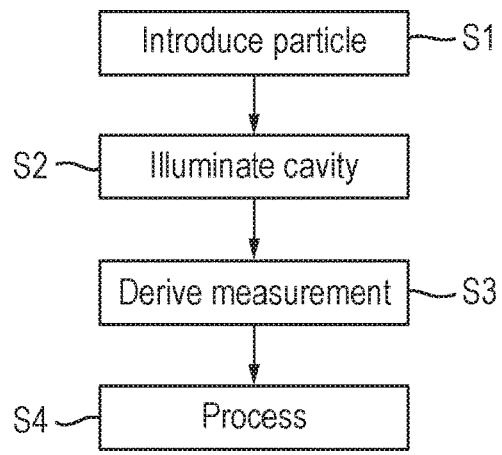
FIG. 7 is a flow chart of a method of characterising a particle.

A method of using the optical cavity 1 to characterise a particle is shown in FIG. 7 and performed as follows. The method is described with reference to an individual particle 8 introduced into a single optical cavity 1, but can equally be performed in respect of individual particles 8 introduced into plural optical cavities 1, for example using the device 10 shown in FIG. 3, or in respect of plural particles 8 introduced into a single optical cavity 8, for example using the device 10 having the extended planar configuration.

In step S1, an individual particle 8 is introduced into the optical cavity 1.

In step S2, the optical cavity containing the particle 8 is illuminated with light that excites resonance of an optical mode of the optical cavity 1. The light may be from a laser.

In step S3, measurements of at least one parameter of the excited resonance are derived. The presence of the particle 8 in the optical cavity 1 perturbs the resonance as a result of the difference in refractive index between the particle 8 and the surrounding fluid 7. Thus, the measurements are dependent on the polarizability of the particle 8 and its location within the optical cavity 1, and so intrinsically characterise the particle 8 in the optical cavity 1.

In step S3, the particle 8 may be optically trapped within the optical cavity 1. In that case, the particle 8 is retained within the potential well of the optical cavity 1 where it undergoes Brownian motion such that its position within the optical mode varies with time. This is advantageous because the measurements are then dependent on the location of the particle 8 within the optical cavity 1 and so provide information about the interaction between the particle 8 and the optical mode as the particle 8 diffuses in the trapping potential.

As the particle 8 is trapped in the confined optical field within a fluid environment, it is free from contact with surfaces and extended study of the particle 8 with minimal perturbation to its properties is possible. The optical trap operates at low optical powers, minimising heating of the particle 8. These features are of particular use where the trapped particle 8 may be highly sensitive to its local environment, as is often the case in the life sciences.

Optical trapping is advantageous but not essential. The method may alternatively be applied to an optical cavity 1 wherein the particle 8 is not trapped so that the measurements are derived as the particle 8 passes through the optical cavity 1.

The at least one parameter may be any parameter of the resonance. The at least one parameter may include without limitation and in any combination the resonant frequency, phase, amplitude or line width of the resonance. The parameter may be a resonant frequency, phase, amplitude, width, or other parameter of a resonance in a mode for which polarization degeneracy has been lifted.

Some specific examples and further processing of derived parameters in step S4 are described below.

Where the method is performed in respect of plural particles 8 introduced into a single optical cavity 8, step S1 is modified to introduce plural particles 8 into the optical cavity 1, step S2 is modified to illuminate the optical cavity 1 with light that excites resonance of an optical mode of the optical cavity 1 in localised regions around individual particles 8 that are affected by the individual particles 8, and step S3 is modified to take measurements of at least one parameter of the excited resonances in respect of the localised regions. However, otherwise the method is the same.

Where plural optical cavities 1 having different resonant frequencies are used, or plural resonances in localised regions having different resonant frequencies are detected, the resonances are separated in frequency (and therefore also in wavelength). This separation provides spatial resolution of the optical cavities 1 by allowing at least one parameter to be derived in respect of each resonance and hence in respect of each particle 8.

In step S4, the measurements derived in step S3 may optionally be processed to derive further information that characterises the particle 8.

There will now be described an example of a system 20 for performing a method of this type. The system 20 may include any type of device 10 described herein, including the device 10 as described above having plural optical cavities 1 as shown in FIG. 3, or the device 10 having the extended planar configuration.

The device 10 is located in a flow cell assembly 21 which allows the injection of the fluid 7 containing the particles 8 between the reflectors whilst the optical measurements are performed. The flow cell assembly 21 comprises a base 22 and a cap 23. The substrate 5 is mounted in the base 22 and the substrate 4 is mounted in the cap 23. The base 22 and cap 23 are fixed together and sealed by a peripheral seal 19, so that the optical cavities 1 are formed between the substrates 4, 5.

The base 22 also comprises a fluid inlet 24 and a fluid outlet 25 for passing fluid 7 between the substrates 4, 5 using a fluidics system (not shown).

In this embodiment, the base 22 and cap 23, and hence the substrates 4, 5 and relatively movable to change the cavity length of the optical cavities 1. A measurement actuator 30 and a control actuator 31 are arranged to relatively move the base 22 and cap 23, and hence the substrates 4, 5. The measurement actuator 30 is a piezoelectric actuator driven at AC frequencies and the control actuator 31 is a piezoelectric actuator driven at DC.

The substrates 4, 5 are transparent and the base 22 and cap 23 have central apertures aligned with the substrates 4, 5 to allow the passage of light through the device 10, and in particular the optical cavities 1, within the flow cell assembly 21.

A measurement laser 26 and a control laser 27 are arranged to each illuminate the device 10. The output light from the measurement laser 26 and the control laser 27 is shown schematically by different paths in FIG. 8, but in fact the light from the measurement laser 26 and the control laser 27 both pass through the device 10.

The measurement laser 26 and a control laser 27 emit light of different frequencies. In this example, the measurement laser 26 and a control laser 27 are narrow-band sources that each emit light of a single frequency. For example, the measurement laser 26 and the control laser 27 may be have a 5 MHz line width. In one example the measurement laser 26 and the control laser 27 have a maximum power output of 150 mW.

The measurement laser 26 is arranged to simultaneously illuminate plural optical cavities 1 in the device 10, or plural regions of the same optical cavity 1. In particular, the light from measurement laser 26 is split by a beam splitter 36 and directed to plural optical cavities 1 (not necessarily all the optical cavities 1 in the device 10), or plural regions of the same optical cavity 1 (not necessarily across its full area). The beam splitter 36 could in principle be omitted by outputting light from the measurement laser 26 in a single beam that is sufficiently broad to illuminate plural optical cavities 1, but that significantly increases the power requirements of the measurement laser 26.

The measurement laser 26 has frequency selected to excite resonance of an optical mode of the optical cavities 1, or of localized regions of the optical cavity 1 around individual particles 8. For example, in the system 20, the measurement laser 26 may emit light of 640 nm in order to excite the $TEM_{00}$ optical mode of the optical cavity 1. In the case of a device 10 having an extended planar configuration, the ideal coupling will be done by a plane-wave incident onto the cavity 1 in order to address only one type of mode of the continuum of planar modes.

Figure 8:
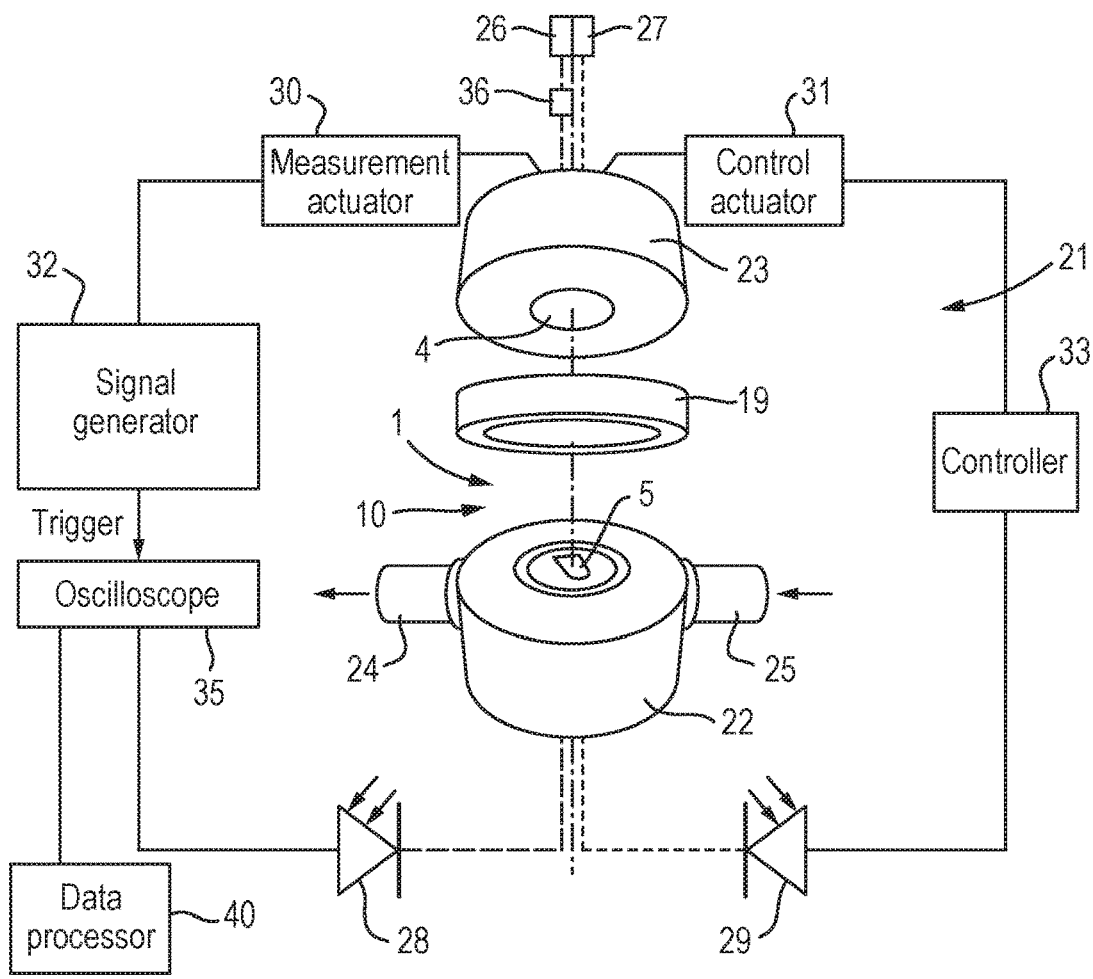
FIG. 8 is a schematic diagram of a system for performing the method.

Measurement and control loops are shown on the left and right hand side of FIG. 8 and are arranged as follows.

A measurement detector 28 and a control detector 29 are arranged to receive the light passing through the device 10, although as an alternative they could be arranged to receive the light reflected from the device 10.

The measurement detector 28 detects light output from the optical cavities 1, or localized regions of the optical cavity 1, at the wavelength of the measurement laser 26. The measurement detector 28 may detect the light output from all the illuminated optical cavities 1 together, or all the localized regions of the optical cavity 1 together. In this case, the measurement detector 28 may be, for example, an avalanche photodiode (APD).

As an alternative, the measurement detector 28 may detect the light output from different illuminated optical cavities 1 separately, or different localized regions of the optical cavity 1 separately, for example by being formed by different detector elements such as separate APDs or as an imaging sensor that can spatial resolve the output light from each illuminated optical cavity 1 or an extended area of the optical cavity 1 including the different localized regions. Use of such a detector that spatially resolves an extended area of the optical cavity 1 including different localized regions permits the resonances in different localized regions around particles 8 to be detected and tracked as the particles 8 move.

The output of the measurement detector 28 may be recorded by an oscilloscope 35.

During the illumination in step S2, the optical cavity or cavities 1 is or are tuned through resonance as follows. Tuning is performed in this example by relatively moving the substrates 4, 5 using the measurement actuator 30. The cavity length may be changed linearly to allow the time axis of the output of the measurement detector 28 to be calibrated to a relative average wavelength for the light from the measurement laser 26 in the optical cavity or cavities 1. The output of the measurement detector 28 is detected during the tuning to derive the overall shape of the resonance.

A signal generator 32 provides an appropriate AC drive signal for the measurement actuator 30, for example in the form of a saw-tooth. The relative movement of the substrates 4, 5 tunes the cavity length through the resonance of the optical cavity or cavities 1 at the wavelength of the measurement laser 26. The tuning through resonance is performed repeatedly in successive scans. The signal generator 32 also provides a trigger for the time sweeps of the oscilloscope 35.

The scanning frequency of the repeated tuning scans may be at least 100 Hz, preferably at least 1 kHz. Desirably, the scanning frequency is high enough that the free diffusion length of the particle 8 between two measurements is much smaller than the characteristic lengths of the cavity mode and the diffusion length of the particle 8 so that the intracavity power may be considered as continuous in time.

The response time of the measurement detector 28 is sufficiently short to resolve the measurements taken during a tuning scan. For example, the response time may be less than 1 nanosecond, in order to provide a detailed response function for each tuning scan.

During each scan, measurements of the intensity taken by the measurement detector 28 are recorded on the oscilloscope 35. The oscilloscope 35 and/or the data processor may tag the measurements with timing information to enable computational analysis of data in the data processor.

The measurements recorded on the oscilloscope 35 are processed by a data processor 40. The data processor 40 may be implemented in a computer apparatus. To achieve this, a computer program capable of execution by the computer apparatus may be provided. The computer program is configured so that, on execution, it causes the computer apparatus to process the data.

The computer apparatus may be any type of computer system but is typically of conventional construction. The computer program may be written in any suitable programming language. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

In step S3, during each scan, the measurements of intensity are processed by the data processor 24 to derive a measurement of at least one parameter of the resonance through which the optical cavity or cavities 1 is or are scanned. Therefore repeated measurements of at least one parameter of the resonance are derived in repeated scans through resonance.

For example, in the case that the parameter is the resonant frequency, it may be derived by determining the time in a scan at which the peak of the resonance occurs, which corresponds to the resonant frequency due to the tuning. Other parameters such as the phase, amplitude or line width of the resonance may similarly be derived.

Where plural optical cavities 1 are used, one or more optical cavities 1 may act as trapping cavities 1a into which a particle 8 is introduced. Where there are plural trapping cavities 1a, measurements may be derived from each trapping cavity 1a in parallel, thereby increasing the amount of data collected.

Where plural optical cavities 1 are used, one or more optical cavities 1 may act as reference cavities 1b into which no particle 8 is introduced. This may be achieved in several any of the following ways.

In embodiments where optical trapping is used, a reference cavity 1b may be provided by illuminating an optical cavity 1 with light of an intensity that is below the threshold required for optical trapping, but sufficiently high to provide a clear signal at the measurement detector 28.

In principle, a reference cavity $1a$ could be provided by preventing particles 8 reaching a particular optical cavity 1 but that is difficult to achieve in practice.

A reference cavity $1b$ may also be provided by treating an optical cavity 1 within the array where the resonance is not perturbed as a reference cavity $1b$.

Where a reference cavity $1b$ exists, the at least one measurement of a parameter of the resonance of each trapping cavity is a differential measurement taken between the trapping cavity $1a$ and the reference cavity $1b$. For example, considering resonant frequency as a parameter, such a differential measurement of the resonant frequency is the difference between the resonant frequencies of the trapping cavity $1a$ and the reference cavity $1b$. This differential measurement of the resonant frequency is referred to herein as a "mode shift", because it may be considered as a shift of the resonant frequency of the optical mode caused by the presence of the particle 8 in a trapping cavity $1a$ compared to a reference cavity $1b$ in which no particle 8 is introduced.

In this manner, the differential measurements may compensate for common mode noise that affects both the trapping cavity $1a$ and the reference cavity $1b$. Use of a reference cavity $1b$ provides an effective method to eliminate any common mode noise that affects both cavity modes, such as mechanical vibrations modulating the mirror separation.

Noise rejection is most effective when the mode wavelength of the trapping cavity $1a$ and reference cavity $1b$ are very similar, since the bandwidth of noise rejection is determined by the time difference between the two transmission resonances. It is therefore desirable for the tuning of the resonance to be scanned at a relatively high frequency to increase the noise rejection bandwidth. In practice, the speed at which the tuning of the resonance is scanned in system 20 may be limited by the resonant frequency of the measurement actuator 30, particularly when formed by a piezoelectric actuator. Actuators other than a piezoelectric actuator, such as mechanical cantilevers, may offer higher resonant frequencies and therefore achieve further improvements in noise rejection.

Similarly, when using a single cavity 1 into which plural particles 8 are introduced, the at least one measurement of a parameter of the resonance of each localised region around a particle 8 may be a differential measurement taken between a localised region around a particle and another region of the optical cavity 1 that does not contain a particle 8. For example, considering resonant frequency as a parameter, such a differential measurement of the resonant frequency is the difference between the resonant frequencies of the region around a particle 8 and a region that does not contain a particle 8. This differential measurement of the resonant frequency is referred to herein as a "mode shift", because it may be considered as a shift of the resonant frequency of the optical mode caused by the presence of the particle 8 compared to a region without a particle 8. This is analogous to a differential measurement between a trapping cavity $1a$ and a reference cavity $1b$, as described above, and may be performed in the same manner with equivalent advantages.

Thus, the system 20 provides tuning of the resonance in the time domain, in particular by relative moment of the reflectors 2, 3. The light output from the optical cavity 1 is detected during tuning through the resonance, so that the shape of the resonance is detected, thereby allowing the parameter of the resonance to be measured.

This simple scanning capability is provided by the use of an open optical cavity or cavities 1 and brings substantial advantages for sensing of particles 8. The system 20 is straightforward to implement and allows measurements to be taken with straightforward optics including a fixed frequency measurement laser 26 and a simple form of measurement detector 28, for example as a photodiode. Since the optical mode is only illuminated when it is in resonance, its intensity is pulsed at the scanning frequency of the tuning. The intensity is nevertheless sufficient to achieve optical trapping. Since the optical mode will always pass through resonance with the laser once per scan cycle, the average trapping potential is not dependent on the position of the particle 8, or the ability of the system to control the relative wavelengths of the laser and optical mode.

However, the method may be modified in various ways to provide a measurement of a parameter of the resonance, for example as follows.

In one type of modification, tuning through resonance in the time domain may be achieved in another manner, for example by varying the frequency of the light emitted by the measurement laser 26. The light output from the optical cavity 1 is again detected during tuning through the resonance, so that the shape of the resonance is detected, thereby allowing the parameter of the resonance to be measured. The at least one parameter of the resonance may be derived in the same way as described above but over the tuning scan of the measurement laser 26. However, this modification requires a more expensive form of laser.

In another type of modification, the resonance of one cavity 1 in an array of optical cavities 1 is locked to a fixed wavelength laser, such that other cavities 1 in the array have fixed resonances that are slightly detuned from the laser. In this way the presence of a particle 8 entering the optical cavity 1 can shift the cavity mode into resonance with the laser, thus illuminating the cavity 1 and producing a signal on the detector. The illumination of the cavity mode applies a force to the particle 8 towards the centre of the mode. The particle 8 can become trapped by this 'self-induced back action' force in which the mode is illuminated only when the position of the particle 8 results in a resonance between the laser and the cavity mode. The output from the detector 28 when this occurs thus represents a parameter of the resonance.

This method of operation has the advantage of exposing the particle 8 to a lower average optical power than other trapping methods, and of not requiring any scanning of either the cavity mode or the laser wavelength. The timing of the detector signals provides information on the diffusion dynamics of the particle 8 and therefore the size of the particle 8. Locking of the cavity length to the fixed laser frequency can be achieved using well-known techniques.

In another type of modification, the light emitted by the measurement laser 26 is a broadband source having a bandwidth extending across the resonance of the optical cavity or cavities 1, in which case the measurement detector 28 is implemented as a spectral detector. In this case, the at least one parameter of the resonance may be derived from the spectral output of the measurement detector 28.

Although the measurement laser 26 is described above as exciting resonance of a single optical mode of the optical cavity or cavities 1, alternatively resonance of two or more modes in the same optical cavity 1 may be monitored to provide more detailed information about the particle 8. This may be achieved by using plural measurement lasers 26 or a broadband measurement laser 26.

The resonance of the optical mode may have a polarised electric field, provided by the illuminating light being polarised. In that case, the shape of the particle 8 may be characterised via the changes in response as the particle 8 rotates relative to the direction of polarisation.

The control detector 29 detects light at the wavelength of the control laser 27 and may be a standard photodiode (PD). The measurements of the intensity taken by the control detector 29 are fed to a feedback controller 33 which may be a PID (proportional-integral-derivative) controller which produces a control signal that drives the control actuator 31.

In this manner, the control detector 28 uses the light from the control laser 27 to provide optical measurement of the cavity length, and the feedback controller 33 controls the relative movement of the opposed reflectors in response thereto to stabilise against drift which occurs over a longer time period than the individual scans. Such drift may be caused, for example, by pressure changes in the intra-cavity medium and thermal effects.

As such, the wavelength of the control laser 27 is chosen to be in a region where the reflectors 2, 3 have a relatively low reflectivity so that the transmitted intensity follows an approximately sinusoidal modulation with the cavity length. For example, a wavelength of 532 nm may be chosen, this being a shorter wavelength than the high reflectivity band of the reflectors 2, 3.

The response time of the control detector 28 and the feedback controller 33 is chosen to respond to the effects of drift. Good performance is achieved if the response bandwidth is greater than 10 Hz, for example of order 100 Hz.

The optical measurement of the cavity length may be obtained from the intensity of monochromatic light reflected from two positions on the device 10 with different lengths to form a Lissajous graph, for example as follows.

The control detector 28 may detect the intensity of the control laser 27 at two positions on the planar part of the reflectors 2, 3 to provide signals X and Y. The mirrors are aligned to produce a slight angle between them such that the fringes are out of phase (for example by a quarter cycle). The plot of Y against X is then a Lissajous graph which can be monitored in real time and provides a direct readout of changes in the cavity length. These measured changes can be used to establish a desired cavity length relative to a reference point such as a closed optical cavity 1, or can be used to stabilise against unwanted fluctuations by feedback of a correcting signal to a control actuator 31 in the form of a DC positioning piezoelectric stack. By making the time constant of the feedback loop slower than the scan rate of the cavity length used to record the mode perturbations, these modulations do not affect the feedback signal. The system 20 shown in FIG. 8 may use a feedback loop bandwidth of 50 Hz and the control actuator has a 2 μm range of motion to allow it to compensate for significant temperature fluctuations.

Figure 9:
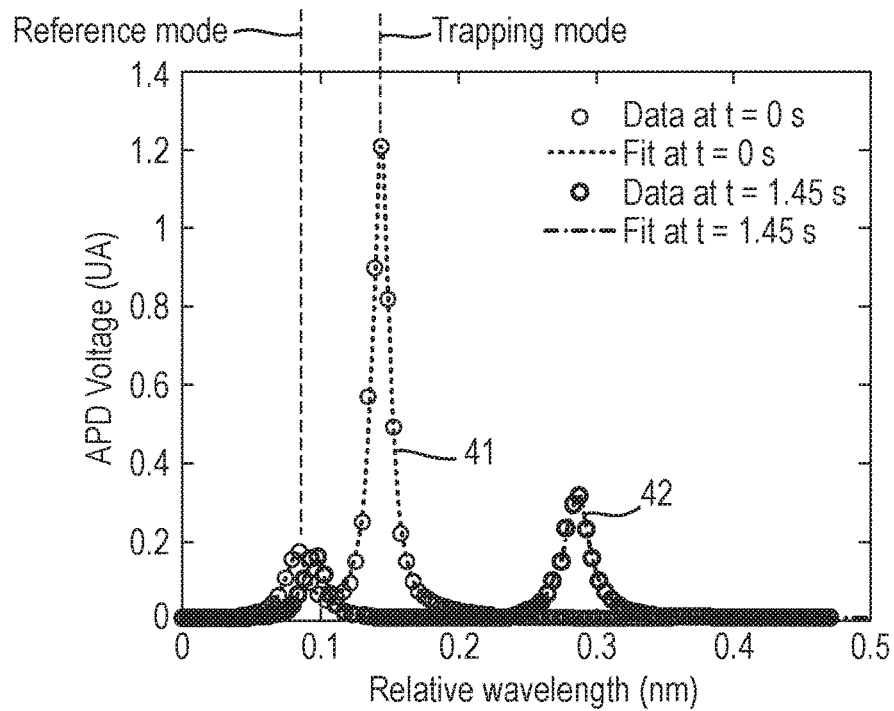
FIG. 9 is a plot of two traces of the output of a measurement detector of the system derived experimentally over two different tuning scans.
Figure 10:
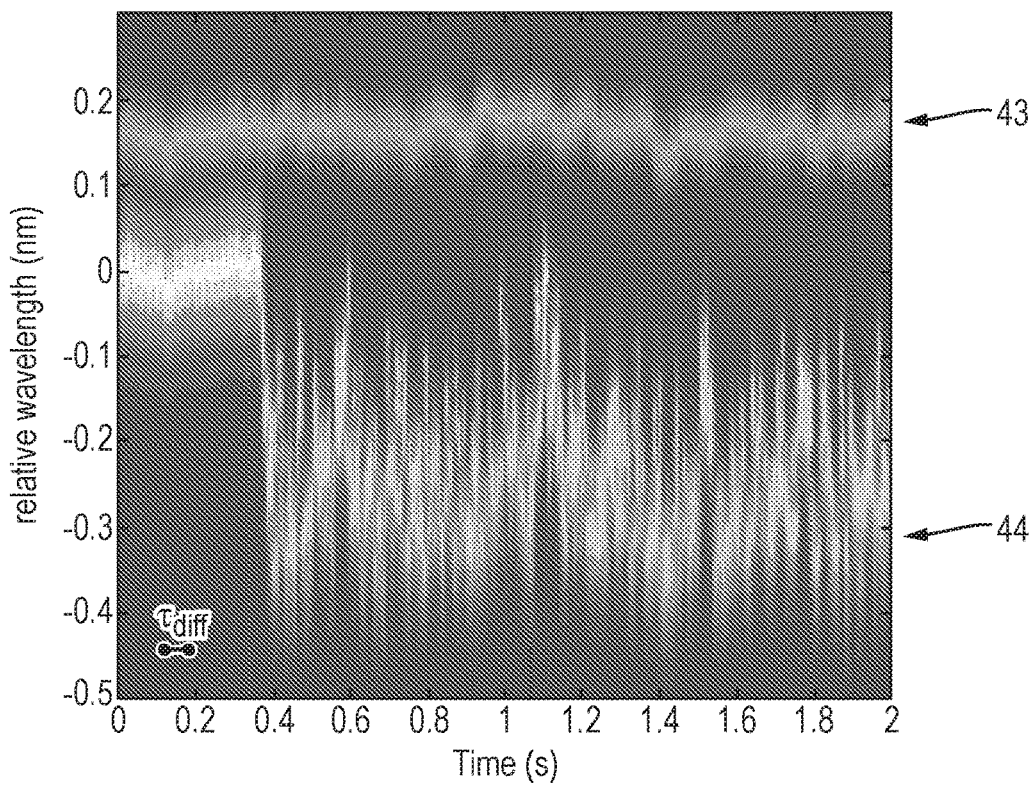
FIGS. 10 and 11 are plots of resonant frequencies measured repeatedly over time.

By way of illustrative example, FIGS. 9 and 10 show some measurements derived by the system 20 including a device 10 of the type shown in FIG. 3. In this example, the particles 8 were polystyrene spheres of nominal diameter 200 nm and refractive index 1.58, and the fluid 7 containing the particles 8 was water. The measurement actuator 26 was driven by a saw tooth drive signal at a frequency of 5 kHz. The parameter measured was the mode shift, i.e. a differential measurement of the resonant frequency. When the cavity mode of interest was within the scanning range over which tuning occurred, measurements of the mode shift $\delta\lambda(t)$ were therefore derived at a sampling rate of 5 kHz. The scanning rate of 5 kHz corresponds to a diffusion length of ~20 nm which is comfortably smaller than the characteristic lengths of the cavity mode and the diffusion length of a particle 8.

The measurement laser 26 was arranged to simultaneously illuminate two optical cavities 1, in particular the trapping cavity 1a and the reference cavity 1b. The device 10 was used with the substrates 4, 5 relatively inclined at a non-zero angle along the rows so as that the cavity length and hence the resonant frequency differed as between the trapping cavity 1a and the reference cavity 1b.

The measurement detector 28 and the oscilloscope 35 were duplicated. However, both the measurement detectors 28 detected output light from all both the trapping cavity 1a and the reference cavity 1b, with the different resonance frequencies thereof being used to provide spatial resolution, as described below.

One oscilloscope 35 was used to monitor the events in real-time so that the user could identify when a particle 8 was trapped in the optical cavity 1 (in an automated system, the monitoring of the state of the optical cavity 1 could be computerised). The other oscilloscope 35 was used to record data for processing by the data processor 40. Occasional events indicating the presence of a particle 8 diffusing through the reference cavity were discarded.

FIG. 9 shows a pair of traces 41, 42 of the output of the measurement detector 28 for a device 10 in which the trapping cavity 1a and the reference cavity 1b have different cavity lengths and hence different resonant frequencies. Each trace 41, 42 is the output for a single scan tuning through resonance, the two traces 41, 42 being recorded at two different times t (specifically at t=0 s and t=1.45 s). These are two of the 5000 traces recorded per second which have been selected to illustrate the shape of the response. modes for two different tuning sweeps. The output signals are recorded in the time domain and the horizontal axis has been converted to a relative average wavelength of the 640 nm light in the optical cavity 1. The scatter plots the measured outputs, while the dotted lines represent fits thereof.

The form of the output signals shown in FIG. 9 is as follows.

Each trace 41, 42 has two resonances corresponding to the resonances of the trapping cavity 1a and the reference cavity 1b, the two resonances being separated due the difference in cavity lengths between the trapping cavity 1a and the reference cavity 1b, which thereby allows spatial resolution of the trapping cavity 1a and the reference cavity 1b due to the separation in the frequency (wavelength) domain. The resonances have Lorentzian line-shapes for each of the resonances which demonstrates that no distortion occurred due to vibrations of the device 10 during the tuning scan through resonance.

Both traces 41, 42 include a resonance at a relative wavelength $\lambda$=0.75 nm (approximately) are the resonances of the reference cavity 1b.

At time t=0 s, there was no particle 8 in the trapping cavity 1a and so the trace 41 includes a resonance of the trapping cavity 1b is at a relative wavelength $\lambda$=0.05 nm (approximately).

At time t=1.45 s, the there was no particle 8 in the trapping cavity 1a and so the trace 42 includes a resonance of the trapping cavity 1b is at a relative wavelength $\lambda$=0.2 nm (approximately). The shift of the resonance of about 0.15 nm compared to the trace at time t=0 s is caused by the presence of the particle 8 in the optical cavity 1 which perturbs the resonance as described above.

The shift of the resonance is dependent on the optical properties of the particle 8 (principally its refractive index which is related to its polarizability) and on the position of the particle 8 within the field distribution of the optical cavity 1, which affects its interaction with the optical mode. As a result of the dependence on the position of the particle 8, the shift when a particle 8 is optically trapped in the trapping cavity 1a varies over time as the particle 8 moves.

By way of illustration, FIG. 10 shows an example of the resonant frequency of the trapping cavity 1b containing a particle 8 measured repeatedly over time, that is by deriving the resonant frequency from the resonances measured during each tuning scan (as shown in FIG. 9).

In FIG. 10, the upper trace 43 plots the relative wavelength (on the same scale as the horizontal axis of FIG. 9 but shifted to move the relative wavelength λ=0 nm compared to FIG. 9) corresponding to the resonant frequency of the resonance of the reference cavity 1b. As can be seen, the resonant frequency of the resonance of the reference cavity 1b is fairly constant at a relative wavelength λ=0.75 nm (approximately) but subject to some noise.

In FIG. 10, the lower trace 44 plots the relative wavelength corresponding to the resonant frequency of the resonance of the trapping cavity 1a. Before time t=0.3 s, there is no particle 8 in the trapping cavity 1a so the resonant frequency is at a relative wavelength λ=0 nm. The similarity in shape between the traces 43, 44 before time t=0.3 s demonstrates the value of using differential positions to achieve common mode noise rejection.

At a time t=0.3 s, a particle 8 becomes trapped in the optical cavity 1 and so the resonant frequency shifts to a negative relative wavelength. Thereafter, the particle 8 diffuses in the trapping potential causing continued rapid shifts in the resonance for a period exceeding 1.5 s. This duration greatly exceeds the free diffusion time $\tau_{diff}$ of about 80 ms, as indicated by the white bar in FIG. 10, thereby demonstrating the optical trapping. The significant fluctuations during this time also show that the particle 8 continues to diffuse freely within the trapping potential.

There will now be described the processing performed in step S4 on the measurements of at least one parameter derived in step S3. This processing derives further information that characterises the particle 8. In general terms, this processing derives one or more measures of a characteristic of the particle that is dependent on the motion of the particle 8 in the optical cavity 1, from a distribution of the repeated measurements, thereby leveraging the repeated measurements to provide additional information. For example, the measures may comprise measures of, without limitation, one or more of the coefficient of friction for the motion of the particle 8, the polarizability of the particle 8, the refractive index of the particle 8, the optical absorption of the particle 8 or the optical scattering cross-section of the particle 8.

The measure may be a measure of a characteristic that is dependent on the shape of the particle 8, for example a full or partial polarizability tensor, or a measure of the ellipticity of the nanoparticle. The fundamental mode of the microcavity is twice degenerated in polarization. An elongated particle would induce a birefringence effect and lift this degeneracy. The fundamental mode would therefore split into two modes under the effect of the anisotropic particle. Ideally, the microcavity needs to be illuminated by a circularly polarized light in order to excite equally the two modes. This splitting would be maximal if the nanoparticle lies transversely and would be minimal if the particle lies longitudinally. During a trapping event, the particle would explore all the possible spatial configurations because of its Brownian motion. The maximum splitting would correspond to the particle lying transversely. The splitting can be directly connected to the degree of anisotropy of the particle by a model (such as the couple dipole model or the depolarization factor for example). One can also study the polarization state of the light (i.e. its Stokes parameters) at the output of the microcavity in order to measure the mode splitting and therefore the particle anisotropy.

The following description makes reference to results obtained using the system 20 described to measure the same particles 8 and fluid 7 as discussed above with reference to FIGS. 9 and 10. For ease of reference, some of the following description relates to examples where the optical cavity 1 is of the type shown in FIG. 1, but this is not limitative and the examples could be applied in a similar manner to other types of optical cavity 1, including the optical cavity 1 of the type shown in FIG. 2.

A first type of processing in step S4 is as follows.

This processing uses the parameter of resonant frequency of the resonance derived in step S3, combined with the prolonged trapping of the particle 8 to derive a measure of the polarizability of the particle 8.

Figure 11:
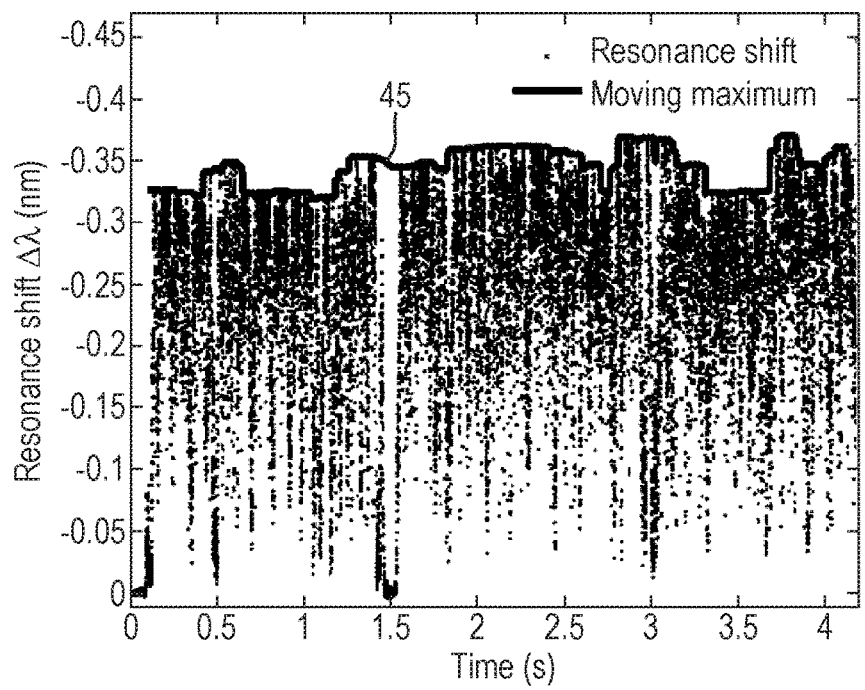

FIG. 11 shows a typical plot of resonant frequency over time caused by a particle 8 trapped in an optical cavity 1 over a period of 4 seconds.

A measure of the polarizability of the particle 8 may be determined from the maximum shift in resonant frequency observed (the maximum being determined within a time window of 80 ms), as this is known to correspond to the particle 8 being located at the maximum field intensity of the confined cavity mode 6. For example, in the data shown in FIG. 11, a shift of 370 pm corresponds to a polarizability of $8.4 \times 10^5$ nm$^3$, this being in good agreement with the prediction of Mie theory which gives a polarizability of $10.5 \times 10^5$ nm$^3$ for the nominal particle diameter.

The data in FIG. 11 reveals that the maximum shift in resonant frequency exhibits steps as a function of time (as shown by the thick line drawn on top of the plotted data) between four levels. This behaviour is attributed to the hopping of the trapped particle 8 between the four antinodes 12 of the optical mode as shown in FIG. 5. The greatest shift occurs in the antinode where the field intensity is the strongest, located at the beam waist next to the planar reflector 2.

Figure 12:
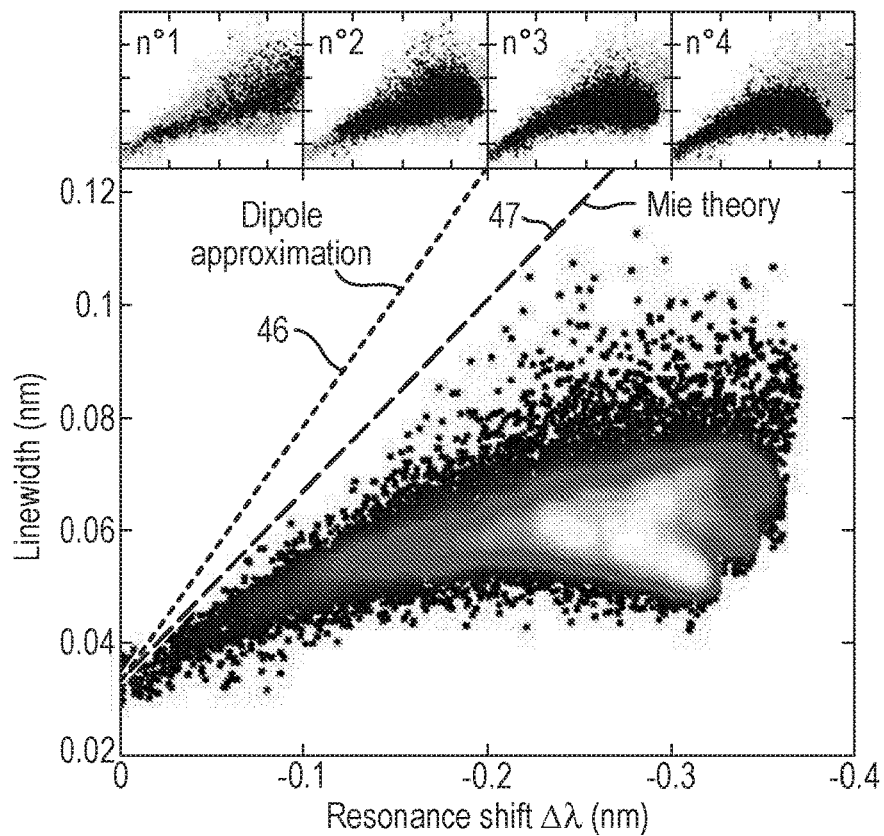
FIG. 12 is a scatter plot of resonant frequency of the resonance and the line width of the resonance for a set of multiple repeated measurements derived experimentally.

Changes to the measured mode line width are also observed, and are attributed to scattering or absorption of cavity photons by the particle 8. An interesting property of the cavities 1 is revealed by recording the change in mode line width as the particle 8 diffuses. FIG. 12 displays a scatter graph of the line-width as a function of the shift, with a colour scale relating to the density of points.

A second type of processing in step S4 is as follows.

This processing uses the parameters of resonant frequency of the resonance and line width of the resonance derived in step S3. The line width of the resonance is of interest because it is dependent on the degree of scattering by the particle 8. Other parameters that are dependent on scattering could be used in a similar manner.

FIG. 12 is a set of scatter plots of these two parameters against each other for repeated measurements. The main plot in FIG. 12 is for all the measurements. This indicates that the degree of scattering by the particle 8 is substantially lower than predicted by the dipole approximation or Mie theory which are shown by dotted lines 46, 47. This is caused by the reduced optical density of states in the optical cavity 1, which lessens the scattering cross section by providing fewer states for photons to scatter into from the optical mode.

The insets in FIG. 12 are separate scatter plots for four subsets of the data corresponding to the particle 8 being in the four antinodes 12, which is determined as described above. This shows that the degree of scattering differs as between the particle 8 being present in the four antinodes 12, thereby illustrating the different degrees of scattering in each one.

A third type of processing in step S4 is as follows.

This processing uses the parameter of resonant frequency of the resonance (mode shift) derived in step S3. The distribution of that parameter is used to derive a measure of the trap strength (the ratio of the depth of the trapping potential to the thermal energy) and in turn to derive a measure of the polarizability of the particle 8 and a measure of the temperature of the particle 8, as follows.

A particular mode shift (resonant frequency) can in general be caused by a number of different positions of the particle 8 in the trapping potential, and so one can define a density of states $\rho$ that represents the relative number of positions that the particle 8 can take to give a particular mode shift. The variable for the density of states is chosen to be $\upsilon = 1 - \Delta\lambda$ where $\Delta\lambda$ is the normalised mode shift (i.e. $\Delta\lambda = 1$ corresponds to the maximum mode shift in a dataset), since it is convenient for this variable to be zero at the minimum of the trapping potential. For a trap depth U the potential energy of the particle 8 above the trap centre is then equal to $\upsilon U$, and the probability of a particular mode shift occurring is given by a Boltzmann distribution of population of the available states in accordance with $$N(\upsilon) = N_0 \rho(\upsilon) e^{-f\upsilon} \tag{1}$$

Where $N_0$ is a normalisation constant and U is the potential depth of the trap. The population of available states $N(\upsilon)$ is referred to herein as the Probability of Occupation (PO). The parameter $$f = U/k_B T \tag{2}$$

is known as the trap strength, while the trap depth U is related to the polarizability $\alpha$ of the particle 8 and the maximum electric field intensity in the trap $I_0$ by $$U = \alpha I_0 / nc\varepsilon_0 \tag{3}$$

where n is the refractive index of the fluid 7, c is the speed of light in vacuum, and $\varepsilon_0$ is the permittivity of free space. The temperature T is also dependent on the intra-trap field intensity via the expression $$T(P_0) = T_0 + \beta P_0 \tag{4}$$

where $T_0$ is the ambient temperature, $P_0$ is the intra-cavity power and $\beta$ is a constant.

Since $P_0$ is proportional to the power of the 640 nm laser used to illuminate the cavity mode and $\rho(\upsilon)$ is independent of $P_0$, plotting the measured distribution of mode shifts $N(\upsilon)$ at a selection of laser powers allows determination of the two parameters U and $\beta$, which are the measures of the trap depth and the temperature of the particle 8, respectively. The trap depth U is therefore established as a function of incident laser power.

Figure 13:
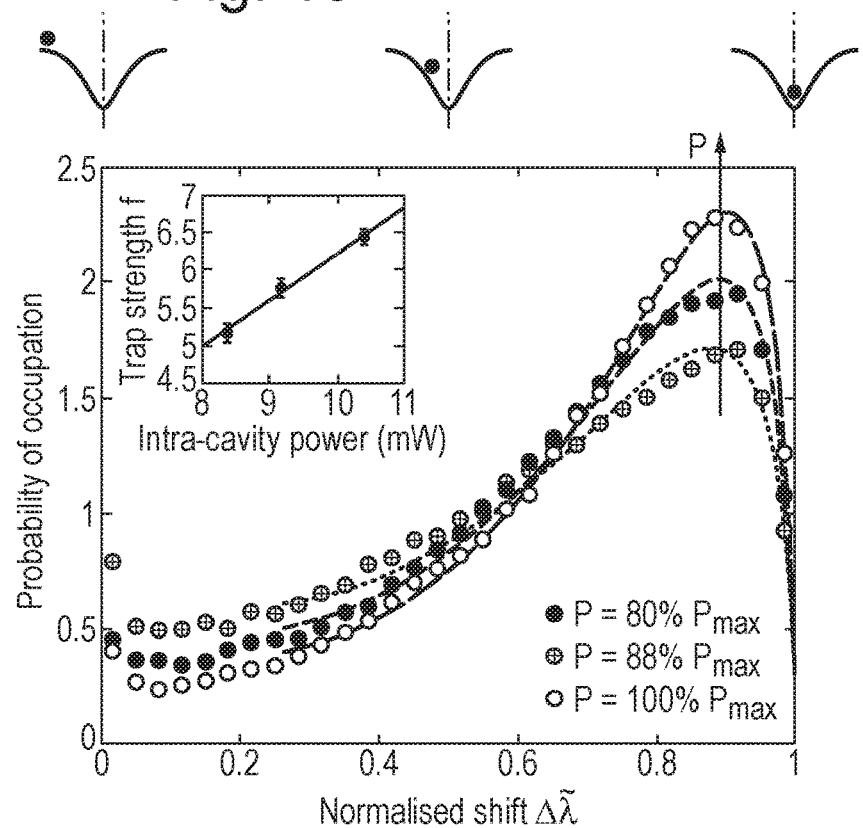
FIG. 13 is a plot of the Probability of Occupation against the normalised shift for a set of multiple repeated measurements derived experimentally.

To illustrate this processing, FIG. 13 shows the Probability of Occupation $N(\upsilon)$ measured experimentally at three different powers of the measurement laser 26, being 80%, 88% and 100% of the maximum laser power. In FIG. 13, the Probability of Occupation $N(\upsilon)$ is plotted against the normalised mode shift $\Delta\lambda$. The scatter plots show experimental data for three different laser powers P, while the solid lines represent fits to equation (1), the product of the trap density of states with the Boltzmann thermal distribution function. The inset shows the trap strength derived from the measurements at the three different powers of the measurement laser 26 as a function of the intra-cavity optical power. The line in the inset is the fit of equations 2 and 4 to these data points which also passes through the origin, providing an upper limit on the temperature parameter $\beta$.

The three powers of the measurement laser 26 shown in FIG. 13 are only sufficient to place an upper limit on the parameter $\beta$, such that we can be sure that the temperature is raised by no more than 50 K. Measuring at a larger number of powers of the measurement laser 26 would increase the accuracy in determining this fitting parameter and provide a more accurate value for the parameter $\beta$.

The extracted density of states function $\rho(\upsilon)$ provides detailed information about the trapping potential. Here the modelled trapping potential is used to achieve a fit to the measured Probability of Occupation $N(\upsilon)$. The high degree of reproducibility in the cavity mode distribution of these optical cavities 1 means that the use of FDTD simulations of field intensity is reliable, but $\rho(\upsilon)$ can also in principle be extracted from the measured distributions such that a priori knowledge of the trapping potential is not required.

A fourth type of processing in step S4 is as follows.

The method described above establishes a measure of the polarizability of the particle 8 and calibrates the trap depth to the incident intensity of the light that is used to illuminate the optical cavity 1. The fourth type of processing uses the parameter of resonant frequency of the resonance (mode shift) derived in step S3 to derive a measure of the coefficient of friction (or diffusivity) which in turn is used to derive a measure of the size of the particle 8.

The measure of the coefficient of friction is derived as follows using an autocorrelation function of the mode shift.

The autocorrelation function for the time-dependent mode shifts is given by $$C(\tau) = \langle \Delta\lambda(t-\tau)\Delta\lambda(t)\rangle / \langle \Delta\lambda(t)^2\rangle \tag{5}$$

In the optical cavity 1, the autocorrelation function of the mode shift as a function of time is found to take the form of a bi-exponential decay. The two decay components correspond to the two different trap stiffness values in the axial and transverse directions given by $$C(\tau) = C_0(\exp(-(\tau/\tau_z)) + 2\exp(-(\tau/\tau_{x,y})))/3 \tag{6}$$

The two decay time constants $\tau_z$ and $\tau_{x,y}$ are related to the average values of the trap stiffness in the axial and transverse directions given by $$\tau_z = \gamma/2\langle k_z\rangle \tag{7a}$$

$$\tau_{x,y} = \gamma/2\langle k_{x,y}\rangle \tag{7b}$$

where $\gamma$ is the friction coefficient (hydrodynamic drag) of the particle in the fluid 7, and $\langle k_z\rangle$ and $\langle K_{x,y}\rangle$ are the average trap stiffnesses which can be calculated using equipartition theory giving $$\langle k_i\rangle\langle x_i^2\rangle = k_B T/2 \tag{8}$$

with the mean-squared positions calculated from the Boltzmann distribution of energies and the relationship between normalised wavelength shift and displacement calculated from FDTD modelling data in accordance with $$\langle x_i^2 \rangle = \frac{1}{2} \int_1^0 x_i^2(\Delta\tilde{\lambda}) f e^{-f(1 \cdot \Delta\tilde{\lambda})} d\Delta\tilde{\lambda} \qquad (9)$$

Figure 14:
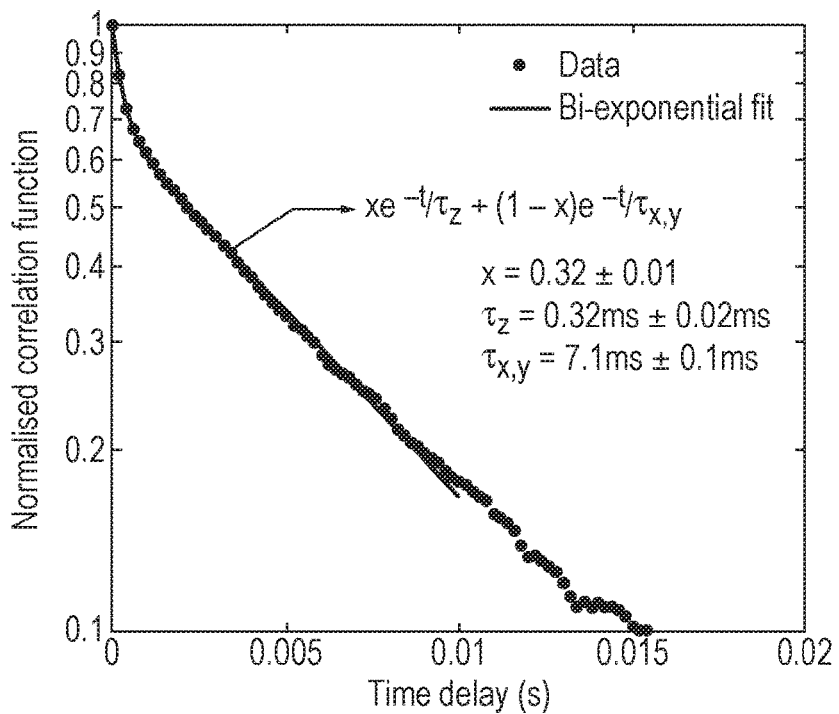
FIG. 14 is a plot of the normalised autocorrelation function derived from experimental measurements, for a sequence of recorded mode shifts.

To illustrate this processing, FIG. 14 shows the normalised autocorrelation function derived from experimental measurements, for a sequence of recorded mode shifts. The scatter plot is experimental data, while the solid lines represent the fits to equation (6), the time constants of which correspond to the different trap strengths in the transverse (x,y) and longitudinal (z) directions. The parameter k=⅓(or ⅔) in equation (6) indicates the contribution to the normalised correlation function of each spatial dimension in the trap.

As can be seen, a good bi-exponential fit is achieved with decay time constants $\tau_z$=0.32 ms±0.02 ms and $\tau_{x,y}$=7.1 ms±0.1 ms.

Figure 15:
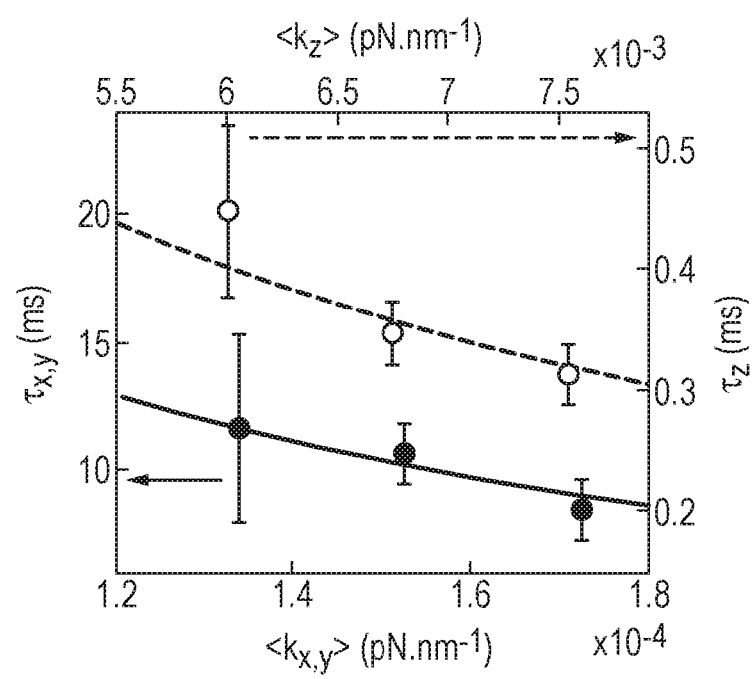
FIG. 15 is plots of calculated mean stiffness parameters against corresponding decay constants of measured correlation functions for three different powers of a measurement laser.

FIG. 15 shows plots 48, 49 of the calculated mean stiffness parameters k against the corresponding decay constants τ of the three measured correlation functions, for the three powers of the measurement laser 26, the plot 48 being for the transverse (x,y) directions and the plot 49 being for the longitudinal (z) directions. Each of the plots 48, 49 displays an inverse relationship that may be used to calculate the coefficient of friction using equations (7a) and (7b), giving values of the coefficient of friction of $\gamma_z$=4.8×10$^{-9}$ kg/s and $\gamma_{x,y}$=3.1×10$^{-9}$ kg/s.

The measure of size of the particle 8 may be derived from measure of the coefficient of friction taking into account the dependence of the coefficient of friction on its size and on the properties of the surrounding fluid 7, as follows.

The coefficient of friction for a particle 8 of radius r in a bulk fluid environment with isotropic viscosity η is given by γ=6πηr. Given a radius r=100 nm, if the particle 8 were diffusing freely in water at room temperature (η≈10$^{-3}$ Pa·s) one would expect $\gamma_z$=$\gamma_{x,y}$=1.7×10$^{-9}$ kg/s. In the results presented here, the presence of the reflectors 2, 3 increases the drag experienced by the particle 8, increasing the coefficient of friction, and the geometry of the optical cavity 1 leads to different increases along z and x,y.

The magnitude can be derived using the analytic expression for a particle 8 at a distance h from a fixed surface, whereby γ is increased according to $$\gamma = \frac{6\pi\eta r}{1 - \frac{9}{16}\left(\frac{r}{h}\right) + \frac{1}{8}\left(\frac{r}{h}\right)^3 + \frac{45}{256}\left(\frac{r}{h}\right)^4 - \frac{1}{16}\left(\frac{r}{h}\right)^5} = 6\pi(1+\chi_h)\eta r \qquad (10)$$

Where $\chi_h$ has been defined as a correction parameter to the bulk expression. In the device 10, the appropriate value of h depends on the field antinode in which the particle 8 is trapped: for 200 nm diameter particles 8 trapped in the field antinodes directly adjacent to the mirrors (1 and 4) where the average separation of the centre of a particle 8 from the mirror is λ/4n, the correction parameter is calculated to be $\chi_h$=0.51 whilst for those trapped in field antinodes 12 numbered 2 and 3, where the average separation of the centre of a particle 8 from the mirror is 3λ/4n, we find that $\chi_h$=0.18.

The invention claimed is:

1. A device for detecting characteristics of polarizable particles in a fluid, the device comprising:
an open optical cavity comprising opposed optical reflectors for containing fluid therebetween;
a flow cell assembly for introducing at least one particle through the fluid into the optical cavity;
an illumination source configured to illuminate the optical cavity containing the particle with light that excites a resonance of an optical mode of the optical cavity that is affected by an individual particle, wherein the device is configured such that when the optical cavity is illuminated, the device tunes through the resonance; and
a data processor for deriving at least one measurement of at least one parameter of the excited resonance and for deriving at least one characteristic of the at least one particle from the at least one measurement, wherein the device is configured to tune through the resonance repeatedly and derive repeated measurements of at least one parameter of repeatedly tuned resonances;
wherein the optical cavity has an optical mode volume of 10 μm$^3$ or less.

2. The device according to claim 1, wherein the opposed reflectors are relatively movable and the device is configured to tune through the resonance by relatively moving the opposed reflectors to tune the cavity length.

3. The device according to claim 1, further configured to monitor the cavity length during tuning by performing optical measurement, and to control the relative movement of the opposed reflectors in response to the monitored cavity length to stabilise against drift.

4. The device according to claim 1, wherein the device is configured to measure the light output from the optical cavity and derive the at least one measurement of the at least one parameter from the measured light.

5. The device according to claim 4, wherein the device is configured to tune through the resonance and measure the light output from the optical cavity during the tuning through the resonance.

6. The device according to claim 1, wherein the illumination source is a laser configured to illuminate the optical cavity containing the particle with light from the laser.

7. The device according to claim 1, wherein the illumination source is configured to provide illuminating light which is polarised and the resonance of the optical mode has a polarised electric field.

8. The device according to claim 1, wherein the optical cavity has a finesse of 100 or more.

9. The device according to claim 1, wherein at least one of the opposed optical reflectors is concave in two orthogonal dimensions.

10. The device according to claim 1, wherein both of the opposed optical reflectors are planar.

11. The device according to claim 1, wherein
an array of plural optical cavities, including the first defined optical cavity are provided, each optical cavity comprising opposed optical reflectors, at least one of which is concave in two dimensions, containing the fluid, and
the device is configured to:
introduce individual particles through the fluid into respective optical cavities;
illuminate the optical cavities with light that excites resonances of an optical mode of the optical cavities that are affected by the particles in respect of optical cavities that contain a particle, and
derive at least one measurement of at least one parameter of the excited resonances in respect of each optical cavity that contains a particle.

12. The device according to claim 11, wherein the device is configured to illuminate all the optical cavities with light from the same light source that excites resonances of optical modes of the optical cavities at different resonant frequencies.

13. The device according to claim 11, wherein the optical cavities have optical modes at different resonant frequencies.

14. The device according to claim 11, wherein the device is configured to introduce an individual particle through the fluid into more than one of the optical cavities.

15. The device according to claim 11, wherein the plural optical cavities include a reference optical cavity into which a particle is not introduced, and said at least one measurement of at least one parameter of all the excited resonances is derived in respect of each optical cavity that contains a particle is a differential measurement between the optical cavity containing a particle and the reference cavity.

16. The device according to claim 1, wherein the device is configured to:
 introduce plural particles through the fluid into the optical cavity;
 illuminate the optical cavity with light that excites resonances of an optical mode of the optical cavities in localised regions around individual particles that are affected by the individual particles; and
 derive at least one measurement of at least one parameter of the excited resonances in respect of said localised regions of the optical cavity.

17. The device according to claim 16, the device being configured to illuminate the optical cavity with light from the same light source that excites resonances of optical modes in respect of the localised regions at different resonant frequencies.

18. The device according to claim 16, wherein said at least one measurement of at least one parameter of the excited resonances is derived in respect of said localised regions is a differential measurement between the localised regions of the optical cavity that contains respective particles and a region of the optical cavity that does not contain a particle.

19. The device according to claim 1, wherein the resonance optically traps the particle in the optical cavity.

20. The device according to claim 1, wherein the at least one parameter comprises at least one of: the resonant frequency; phase; amplitude; width of the excited resonance; width of a resonance of a mode for which polarization degeneracy has been lifted; and at least one parameter that is dependent on light scattering by the particle.

21. The device according to claim 1, wherein the device is configured to derive repeated measurements of at least one parameter of the excited resonance.

22. The device according to claim 1, the device is further configured to derive a measure of a characteristic of the particle that is dependent on the motion of the individual particle in the optical cavity, from a distribution of repeated measurements.

23. The device according to claim 22, wherein said measure is one of: a characteristic of the particle is a measure of the polarizability of the particle; a measure of the full or partial polarizability tensor; a measure of the temperature of the particle; a measure of the coefficient of friction of the particle in the fluid that is derived using an autocorrelation function of the distribution of the repeated measurements.

24. The device according to claim 23, wherein said measure of the full or partial polarizability tensor is a measure of the ellipticity of the nanoparticle.

25. The device according to claim 23, further configured to derive a measure of the size of the particle from the measure of the coefficient of friction.

* * * * *